A. M. LAYCOCK.
ROLLER BEARING.
APPLICATION FILED MAY 7, 1917.
1,289,827.
Patented Dec. 31, 1918.
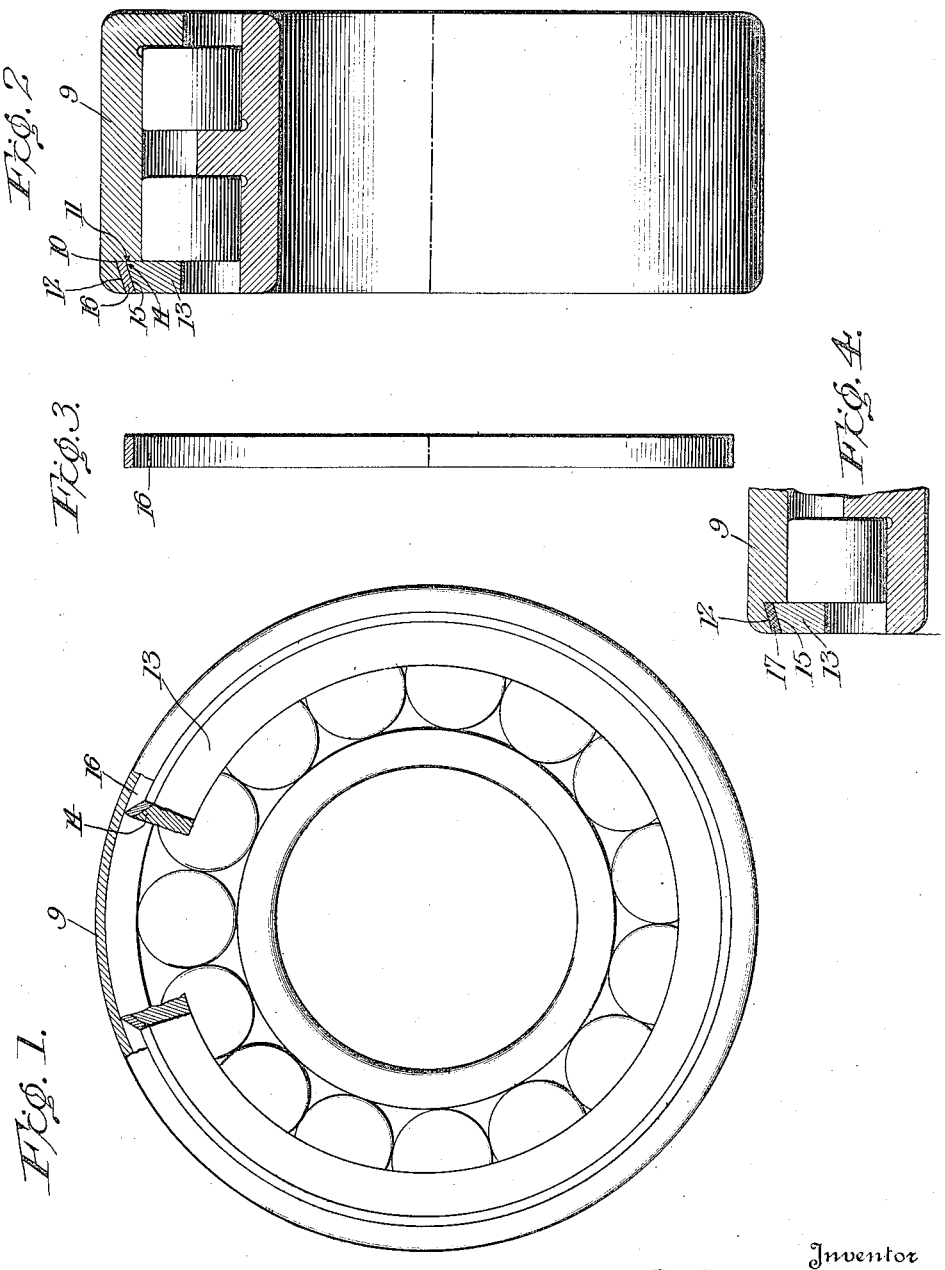

UNITED STATES PATENT OFFICE.

ARTHUR M. LAYCOCK, OF KINGSTON, PENNSYLVANIA.

ROLLER-BEARING.

1,289,827.  Specification of Letters Patent.  Patented Dec. 31, 1918.

Application filed May 7, 1917. Serial No. 166,981.

*To all whom it may concern:*

Be it known that I, ARTHUR M. LAYCOCK, formerly a subject of the King of Great Britain, but having taken out my first naturalization papers in the United States, residing at Kingston, Luzerne county, State of Pennsylvania, have invented certain new and useful Improvements in Roller-Bearings, of which the following is a specification.

This invention relates to roller bearings and more particularly to a construction for securing the retaining ring or end thrust ring to one of the race rings. To this end the race ring is provided with a wedge recess and the retaining ring with a correspondingly shaped wedge, the inclined surface of the latter being spaced from the inclined surface of the wedge recess and the space between these two surfaces being filled with a locking member. The invention will be more fully described in connection with the drawings, in which:—

Figure 1 is a side elevation of a roller bearing provided with my invention, a portion of the retaining ring being broken away and the broken ends being shown in perspective;

Fig. 2 is an end elevation of the construction shown in Fig. 1, the upper portion of the bearing being shown in section;

Fig. 3 is a half elevation and half section view of the locking ring before it has been inserted in the bearing;

Fig. 4 is a fragmentary sectional view showing the retaining ring secured to one of the race rings by lead, babbitt or other soft material.

Referring to the drawings it will be observed that in the embodiment of the invention illustrated, one end of the outer race ring 9 of the bearing is formed with a wedge recess 10. This recess is bounded on one side by a flat surface 11 lying in a plane transverse to the axis of the bearing, and on the other side by an inclined surface 12 which may be continuous around the ring to thereby constitute an annular wedge recess. If the surface 12 is continuous it will be observed that it is a conical surface. The retaining ring or end thrust ring 13 is formed with a wedge portion 14, the inclined surface 15 of which is spaced from the inclined surface 12 on the race ring. If the said surface 15 is continuous around the entire ring the wedge on the ring may be termed an annular wedge. In this latter case the surface 15 is a conical surface and is substantially parallel to the surface 12 of the race ring. In order to be able to insert the retaining ring 13 in position the outer diameter of the said ring must be such that it may be thrust through the end opening of the race ring. When the ring 13 is located in the position shown in Fig. 2 the locking ring 16 of soft steel or other workable material is forced in to fill the space between the surfaces 12 and 15. It will thus be apparent that the resulting construction securely locks the retaining ring 13 against axial movement.

In the form of the invention illustrated by Fig. 4 the retaining ring 13 is adapted to be secured in position by means of running lead, babbitt or some other composition 17 between the surfaces 12 and 15.

It will be observed that with this construction the race ring may be tempered to any desired degree of hardness and that it is not necessary to draw the temper of the lip at the retaining end of the same as was required in the type of bearing in which the retaining ring was locked to the race ring by bending the lip over the periphery of the retaining ring.

It will be apparent that although I have illustrated the invention as applied to the outer race ring, it is not restricted to this ring but may be applied to others and also that the wedge surfaces need not be continuous and that the above described embodiment of this wedge or dove-tail locking feature may be varied considerably without departing from the spirit of my invention.

Having thus described the invention what is claimed and desired to be secured by Letters Patent is:

1. In a roller bearing, a race ring, a coöperating retaining ring provided with a wedge, said race ring being formed with a similarly shaped wedge recess in one end, the inclined surface of the wedge being spaced from the inclined surface bounding the recess, and a locking member filling the space between said surfaces.

2. In a roller bearing, a race ring, a coöperating retaining ring provided with an annular wedge, said race ring being formed with a similarly shaped wedge recess in one end, the inclined surface of the wedge being spaced from the inclined surface bounding the wedge recess, and a locking ring filling the space between said surfaces.

3. In a roller bearing, a race ring formed with a recess in one end, one of the surfaces bounding the recess being conical, a retaining ring having a conical surface spaced from and substantially parallel to the conical surface of the race ring, and a locking ring filling the space between the said conical surfaces.

4. In a roller bearing, an outer race ring formed with a recess, one of the surfaces bounding the recess being in a plane transverse to the axis of the bearing and the other surface being conical, a retaining ring having an outer conical surface spaced from and substantially parallel to the conical surface of the race ring, and a locking ring filling the space between the said conical surfaces.

5. In a roller bearing, a race ring formed with a wedge recess, a retaining ring having a wedge the inclined surface of which is substantially parallel to the inclined surface bounding the wedge recess, and means interposed between said surfaces to secure the said rings against relative movement.

6. In a roller bearing, a race ring formed with a wedge recess, a retaining ring having an integral wedge portion spaced from the race ring, and a locking member in said recess engaging the said wedge portion.

In testimony whereof I affix my signature.

ARTHUR M. LAYCOCK.